(12) United States Patent
Myers

(10) Patent No.: US 7,685,763 B1
(45) Date of Patent: Mar. 30, 2010

(54) DEVICE FOR HOLDING FISH TO REMOVE A FISH HOOK FROM THE MOUTH OF A FISH

(75) Inventor: George Edgar Myers, 14117 - 75th La. North, Loxahatchee, FL (US) 33470

(73) Assignee: George Edgar Myers, Loxahatchee, FL (US)

( * ) Notice: Subject to any disclaimer, the term of this patent is extended or adjusted under 35 U.S.C. 154(b) by 207 days.

(21) Appl. No.: 12/075,766

(22) Filed: Mar. 14, 2008

(51) Int. Cl.
*A01K 97/00* (2006.01)

(52) U.S. Cl. .............................. 43/53.5; 43/4
(58) Field of Classification Search ................. 43/53.5, 43/4, 54.1, 55
See application file for complete search history.

(56) References Cited

U.S. PATENT DOCUMENTS

| | | | | |
|---|---|---|---|---|
| RE21,375 E | * | 2/1940 | Tillinghast | 43/53.5 |
| 2,918,747 A | * | 12/1959 | Terlecky | 43/53.5 |
| 3,081,576 A | * | 3/1963 | Collins | 43/53.5 |
| 3,389,491 A | * | 6/1968 | Lowrey | 43/53.5 |
| 3,738,050 A | * | 6/1973 | Naill | 43/53.5 |
| 3,905,145 A | * | 9/1975 | Cunningham | 43/53.5 |
| 4,014,131 A | * | 3/1977 | Bendik | 43/53.5 |
| 4,023,303 A | * | 5/1977 | Maunu | 43/53.5 |
| D425,172 S | * | 5/2000 | Hall | D22/149 |
| 6,389,731 B1 | * | 5/2002 | Freeman | 43/4 |

* cited by examiner

*Primary Examiner*—Christopher P Ellis

(57) ABSTRACT

A device for holding fish to remove a fish hook from the mouth of a fish, the device comprised of a first hollow cylindrical member, a connecting member attached to a first end of the first hollow cylindrical member, a second hollow cylindrical member attached to a first side of the connecting member, and a third hollow cylindrical member attached to a second opposed side of the connecting member. A gap is located within the second and third hollow cylindrical members, and two dowels are attached to the inside surfaces of the second and third hollow cylindrical members. The second end of the first hollow cylindrical member is fitted over a fishing rod holder. A fish is pulled within the second or third hollow cylindrical member until the fish head is wedged between the dowels at which time the fish hook can be removed from the mouth of the fish.

13 Claims, 3 Drawing Sheets

DEVICE FOR HOLDING FISH TO REMOVE A FISH HOOK FROM THE MOUTH OF A FISH

BACKGROUND

This version of the invention is concerned with the field of fishing devices and accessories. More specifically, this version of the invention is concerned with a device for holding fish to remove fish hook from the mouth of a fish that receives a fish in frictional engagement therein so that a user can remove a fish hook lodged within the mouth of the fish without being injured by a barb, stinger, or other part of the fish.

PRIOR ART

During fishing, a fisherman who hooks and lands a fish removes the fish hook lodged within the mouth of the fish by grasping the fish with one hand and removing the hook with the other hand sometimes with the aid of pliers or nippers. This method of removing the hook can be accomplished with most species and types of fish. However, certain types of fish, such as catfish of a particular type, possess various natural defensive means to ward off predators in the natural world. These natural defensive means can injure a fisherman when the fisherman attempts to grasp the fish to remove a fish hook.

For instance, the exterior surface of the body of such a catfish is covered with a layer of acidic slime. Furthermore, three or more sharps barbs or stingers protrude from the body of the catfish, one on each side and one on the back or spine. The barbs can easily puncture the skin and possibly gloves of a fisherman, causing severe pain and possibly requiring medical attention.

Consequently, removing a fish hook from such a catfish is difficult, if not impossible, and dangerous if attempted. Many fisherman choose not to attempt to remove the fish hook and simply resort to cutting the fishing line at some distance from the mouth of the catfish and releasing the fish back to the water with the fish hook still lodged within the mouth of the catfish. The option injures and possibly kills the catfish and results in lost fishing tackle.

What is needed then to overcome the aforementioned difficulties of removing a fish hook from certain types of fish is a device for holding a fish so that the fish disposed within the device is immobilized and its natural defensive means are isolated from the fisherman. In this manner, a fisherman can remove a fish hook from the mouth of the fish without being injured. The subject of the instant invention presents such a device for holding a fish to remove a fish hook from the mouth of a fish consisting of generally a first hollow cylindrical member, a connecting member, a second hollow cylindrical member, and a third hollow cylindrical member.

The device upon the first hollow cylindrical member thereof is mounted onto on existing fishing rod holder of a fishing vessel or boat. A fisherman pulls a fishing line with a fish hooked thereon through either the second or third hollow cylindrical member until the fish occupies the cylindrical member and is frictionally engaged therein. The cylindrical member encloses the head and partial abdomen of the fish. Furthermore, the head and mouth of the fish are wedged between and against two dowels located within the cylindrical member. With the fish located and immobilized within the cylindrical member and head of the fish covered by the cylindrical member, the fisherman can remove the fish hook from the mouth of the fish without being injured or stung by one or more the barbs of the fish.

DISCUSSION OF THE PRIOR ART

Numerous designs for fish holders have been provided in the prior art. Even though these designs may be suitable for the specific individual purposes to which they address, they would not be suitable for the purposes of the present version of the invention as such designs are intended only to hold a fish without enclosing or isolating that part of the fish that can injure a fisherman. These designs are exemplified by the following patents:

U.S. Pat. No. 2,644,267, Fish Holder For Fishhook Removal, issued to Helgeson on 7 Jul. 1953;

U.S. Pat. No. 3,081,576, Fish Holder, issued to Collins on 19 Mar. 1963;

U.S. Pat. No. 4,014,131, Fish Hook Extractor, issued to Bendik on 29 Mar. 1977;

U.S. Pat. No. 6,272,788, Fish Hook Removing Device, issued to Bergacker on 14 Aug. 2001;

U.S. Pat. No. 6,389,731, Fish Holder, issued to Freeman on 21 May 2002;

U.S. Pat. No. 6,625,921, Fishhook Threader, issued to Friederichs, III on 30 Sep. 2003;

U.S. Pat. No. 6,688,034, Fish Hook Remover, issued to Mantel on 10 Feb. 2004; and U.S. Pat. No. 6,705,042, Fish Hook Removal Apparatus, issued to Harrison on 16 Mar. 2004.

As illustrated by the background art, efforts are continuously being made in an attempt to develop devices for holding fish. No prior effort, however, provides the benefits attendant with the present invention.

As such, it may be appreciated that there is a continuing need for a new and improved device for holding fish to remove fish hook from the mouth of a fish that secures a fish in an immobile position while covering or enclosing those parts of a fish that can injure a fisherman while the fisherman is removing the fish hook from the mouth of a fish. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY

The present version of the invention, which will be described in greater detail hereinafter, relates to the field of fishing devices and accessories. More specifically, this version of the invention is concerned with a device for holding fish to remove a fish hook from the mouth of a fish that receives a fish in frictional engagement therein so that a user can remove a fish hook lodged within the mouth of the fish without being injured by a barb, stinger, or other part of the fish. My version of the invention overcomes all of the shortcomings listed previously, in addition to novel aspects that will be described in detail hereinafter.

Described briefly, according to a typical embodiment, the invention presents a device for holding fish to remove a fish hook from the mouth of a fish that consists generally of a first hollow cylindrical member, a connecting member, a second hollow cylindrical member, and a third hollow cylindrical member.

The first hollow cylindrical member is comprised of a first end and a second opposed end. An aperture is located within the first hollow cylindrical member at the first end thereof, and a notch is located at the second end of the cylindrical member.

The connecting member consists of a hollow cylindrical member and a flange. The flange is connected at a first end to the cylindrical member and extends for some distance therefrom. The flange terminates at a second end, which is wider than the first end. Two apertures are located within the flange.

An aperture is located within the lateral sidewall of the cylindrical member of the connector. A threaded fastener is inserted into the aperture of the lateral sidewall of the cylindrical member of the connecting member and into the aperture of the first hollow cylindrical member to attach the connecting member to the first hollow cylindrical member.

The second and third hollow cylindrical members are each comprised of a first end and a second opposed end. A bore extends the complete length of each cylindrical member. The bores can be accessed from either the first end or the second end of the cylindrical members. Each cylindrical member has a first side edge and a second opposed side edge located along the longitudinal axis thereof. The side edges are separated by a narrow gap and are disposed in parallel relation to each other.

Two opposed apertures are located within each cylindrical member proximate to the second ends thereof. The apertures receive fasteners, and the fasteners attach dowels to the interior surface of each cylindrical member within respective bores thereof.

Two apertures are located within the second hollow cylindrical member proximate to the second edge thereof, and two apertures are located within the third hollow cylindrical member proximate to the first edge thereof. Each pair of apertures extends in parallel to the longitudinal axis of respective cylindrical members. A threaded fastener is inserted through the two apertures of the second hollow cylindrical member, two apertures of the flange of the connecting member, and two apertures of the third hollow cylindrical member, and into cooperating threaded fasteners to attach the second and cylindrical members to each other on opposed sides of the flange.

In this version of the invention, the second hollow cylindrical member is approximately three inches long and has a diameter of approximately 2.5 inches, and the third hollow cylindrical member is approximately three inches long and has a diameter of approximately 3 inches.

The device is mounted onto an existing fishing rod holder of a fishing vessel or fishing boat by placing the first hollow cylindrical member at the second end thereof over the fishing rod holder. The notch at the second end of the first hollow cylindrical member receives or is fitted over a fastener or other component of the fishing rod holder. As such, the notch prevents the first hollow cylindrical hollow member and device from spinning or rotating during use.

During use of the device, a fisherman who has hooked a fish, such as a catfish or other fish with stinging barbs or spines, pulls the fishing line through the gap of either the second or third hollow cylindrical member until the fishing line is disposed within the bore of either cylindrical member. The fisherman continues to pull the fishing line until the fish beginning at the head thereof occupies the bore of either cylindrical member. The fish is secured in frictional engagement within either cylindrical member as the head of the fish is wedged between and against the dowels, and the dorsal fin and lower abdomen of the fish are pulled against the first end of either cylindrical member. With the fish immobilized as such and the head and stinging barbs enclosed and covered, the fisherman can remove the fish hook from the mouth of the fish without risk of being stung or injured by the barbs or other stinging parts of the fish.

My invention, therefore, resides not in any one of these features per se, but rather in the particular combination of all of them herein disclosed. It is distinguished from the prior art in this particular combination of all of its structures for the functions specified.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application nor is it intended to be limiting as to the scope of the invention in any way.

Accordingly, it is an object of my version of the invention to provide a low-cost, easy-to-manufacture, and easy-to-market device for holding fish to remove a fish hook from the mouth of a fish.

A further object of my version of the invention is to provide an easy-to-use and versatile device for holding fish to remove a fish hook from the mouth of a fish.

A significant object of the invention is to provide a device for holding fish to remove a fish hook from the mouth of a fish that is comprised of a first hollow cylindrical member, a connecting member, a second hollow cylindrical member, and a third hollow cylindrical member, the first hollow cylindrical member attached to the connecting member and the second and third hollow cylindrical members attached to each other on opposed sides of the connecting member.

A final but very significant object of the invention is to provide a device for holding fish to remove a fish hook from the mouth of a fish that is releasably attached at the first hollow cylindrical member thereof to an existing fishing rod holder of a fishing vessel in order to receive a fish in firm engagement within either the second or third hollow cylindrical member thereof and thus permit the removal of a fish hook from the mouth of the fish without being injured by one or more barbs of the fish.

For a better understanding of the invention, its operating advantages and the specific objects attained by its uses, reference should be made to the accompanying drawings and descriptive matter in which there is illustrated a preferred embodiment of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention illustrated by the accompanying drawings.

BRIEF DESCRIPTION OF THE DRAWINGS

The foregoing and other objects, features and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

DRAWING REFERENCE NUMERALS

10 Device For Holding Fish To Remove A fish hook From The Mouth Of A Fish
12 First Hollow Cylindrical Member
14 Connecting Member
16 Second Hollow Cylindrical Member
18 Third Hollow Cylindrical Member
20 First End
22 Second End
24 Aperture
26 Notch
28 Cylindrical Member
30 Flange
32 Lateral Sidewall
34 End Sidewall
36 First End
38 Second End
40 Aperture
42 Aperture
44 Fastener
46 First End
48 Second End
50 Bore
52 First Edge
54 Second Edge
56 Gap
58 Aperture
60 Aperture
62 Dowel
64 Bore
66 Fastener
68 First End
70 Second End
72 Bore
74 First Edge
76 Second Edge
78 Gap
80 Aperture
82 Aperture
84 Fastener
86 Fastener
88 Catfish
90 Fishing Line
92 Mouth
94 Dorsal Fin
96 Abdomen
98 Head

DESCRIPTION OF THE PREFERRED EMBODIMENT

Description

Figure 1:
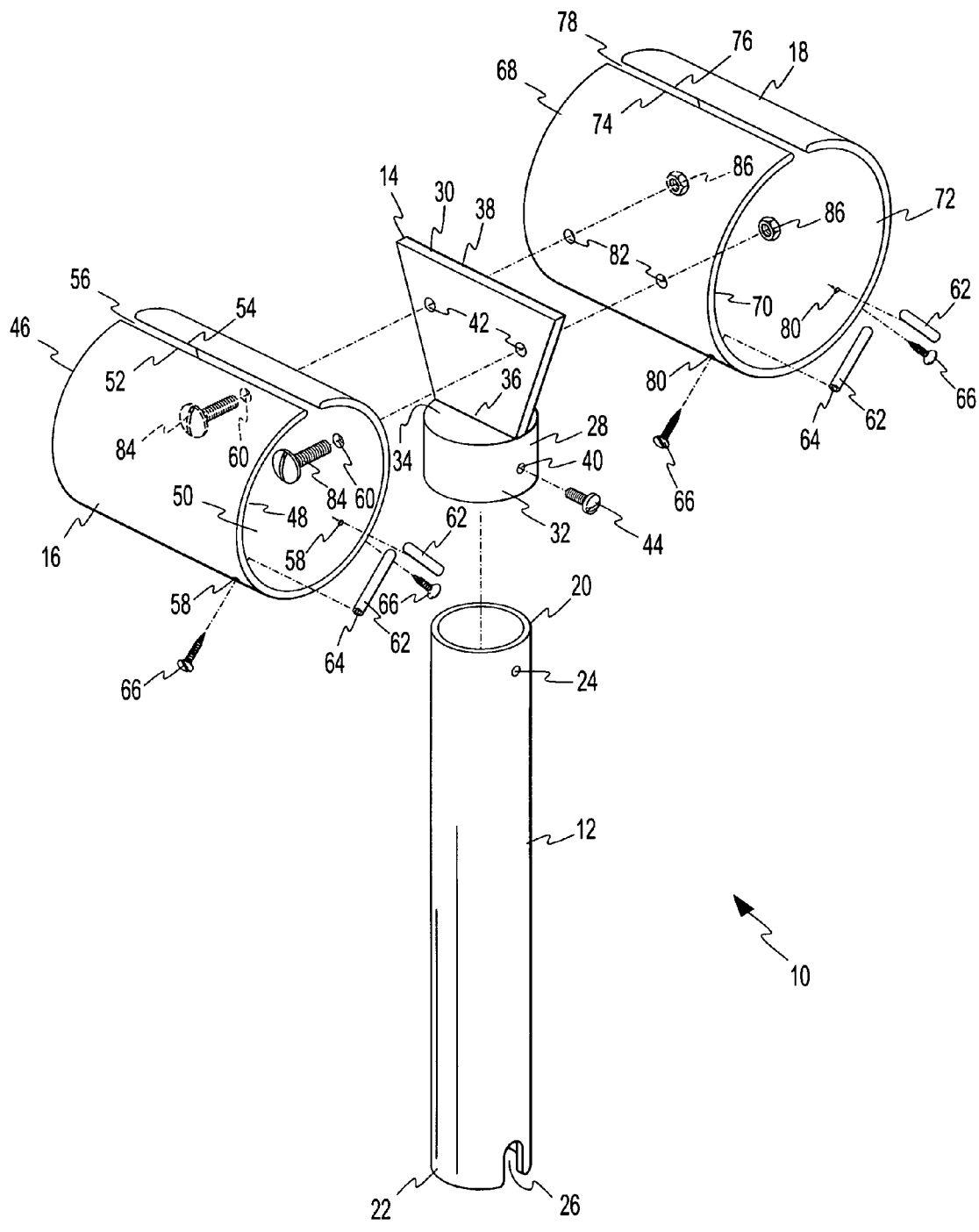
FIG. 1 is an exploded perspective view of a device for holding fish to remove a fish hook from the mouth of a fish in accordance with the present version of the invention.

Referring now to the drawings and, in particular, to FIG. 1 wherein there is illustrated a typical embodiment of the device for holding fish to remove a fish hook from the mouth of a fish 10. The present version of the invention 10 consists generally of a first hollow cylindrical member 12, a connecting member 14, a second hollow cylindrical member 16, and a third hollow cylindrical member 18, which are attached to each other 12, 14, 16, 18 to form the device 10.

Referring again to FIG. 1, the first hollow cylindrical member 12 is defined by a first end 20 and a second opposed end 22. An aperture 24 is located in the first hollow cylindrical member 12 adjacent to the first end 20 thereof, and a notch 26 is located in the first hollow cylindrical member 12 at the second end 22 thereof.

The connecting member 14 is comprised of a hollow cylindrical member 28 and a flange 30. The hollow cylindrical member 28 consists of a lateral sidewall 32 and an end sidewall 34 located at one end of the lateral sidewall 32. The lateral sidewall 32 and the end sidewall 34 of the hollow cylindrical member 28 enclose an interior space within the hollow cylindrical member 28. The flange 30 consists of a first end 36 and a second opposed end 38. The first end 36 of the flange 30 is attached to the end sidewall 34 of the hollow cylindrical member 28. The width of the first end 36 is identical to the diameter of the end sidewall 34 of the hollow cylindrical member 28. The flange 30 expands from a narrower width at the first end 36 thereof to a wider width at the second end 38 thereof.

An aperture 40 is located within the lateral sidewall of the hollow cylindrical member 28, and two apertures 42 are located within the flange 30. A threaded fastener 44 is aligned for insertion into the aperture 40 and eventually the aperture 24 of the first hollow cylindrical member 12. In this manner, the threaded fastener 44 will attach the connecting member 14 to the first hollow cylindrical member 12 at the first end 20 thereof.

The second hollow cylindrical member 16 is defined by a first end 46 and a second opposed end 48. A bore 50 is located within the interior of the cylindrical member 16 and extends along the complete length of the cylindrical member 16. The bore 50 can be accessed at either end 46, 48 of the cylindrical member 16. The second hollow cylindrical member 16 terminates at first 52 and second 54 opposed side edges. The opposed side edges 52, 54 are disposed in parallel relation to the longitudinal axis of the cylindrical member and to each other 52, 54. A narrow gap 56 is located between the first 52 and second 54 side edges and maintains the side edges 52, 54 at a slight distance from each other 52, 54.

Two apertures 58 are located within the second hollow cylindrical member 16 proximate to the second end 48 thereof. Two dowels 62 with central bores 64 are aligned for attachment to the interior surface of the second hollow cylindrical member 16 within the bore 50. Threaded fasteners 66 are aligned for insertion into corresponding apertures 58 of the second hollow cylindrical member 16 and internal bores 64 of the dowels 62 to attach the dowels 62 to the interior surface of the second hollow cylindrical member 16 over respective apertures 58.

Two additional apertures 60 are located within the sidewall of the second hollow cylindrical member 16 along the longitudinal axis thereof proximate to the second edge 54. The apertures 60 are disposed in parallel relation to the longitudinal axis of the cylindrical member 16.

In this version of the invention 10, the second hollow cylindrical member 16 is approximately 3 inches long and has a diameter of approximately 2.5 inches.

The third hollow cylindrical member 18 is defined by a first end 68 and a second opposed end 70. A bore 72 is located within the interior of the cylindrical member 18 and extends along the complete length of the cylindrical member 18. The bore 72 can be accessed at either end 68, 70 of the cylindrical member 18. The third hollow cylindrical member 18 terminates at first 74 and second 76 opposed side edges. The opposed side edges 74, 76 are disposed in parallel relation to the longitudinal axis of the cylindrical member and to each other 74, 76. A narrow gap 78 is located between the first 74 and second 76 side edges and maintains the side edges 74, 76 at a slight distance from each other 74, 76.

Two apertures 80 are located within the third hollow cylindrical member 18 proximate to the second end 70 thereof. Two dowels 62 with central bores 64 are aligned for attachment to the interior surface of the third hollow cylindrical member 18 within the bore 70. Threaded fasteners 66 are aligned for insertion into corresponding apertures 80 of the third hollow cylindrical member 18 and internal bores 64 of the dowels 62 to attach the dowels 62 to the interior surface of the third hollow cylindrical member 18 over respective apertures 80.

Two additional apertures 82 are located within the sidewall of the third hollow cylindrical member 18 proximate to the first edge 74 thereof. The apertures 82 are disposed in parallel relation to the longitudinal axis of the cylindrical member 18.

In this version of the invention 10, the third hollow cylindrical member 18 is approximately 3 inches long and has a diameter of approximately 3 inches.

Threaded fasteners 84 are aligned within the bore 50 of the second hollow cylindrical member 16 for insertion into the apertures 60 of the second hollow cylindrical member 16, apertures 42 of the flange 30 of the connecting member 14, and apertures 82 of the third hollow cylindrical member 18, and for attachment to corresponding threaded apertures 86 located within the bore 72 of the third hollow cylindrical member 18. In this manner, the threaded fasteners 84, 86 attach the first hollow cylindrical member 16 to a first side of the flange 30 of the connecting member 14 and the third hollow cylindrical member 18 to a second opposed side of the flange 30 of the connecting member 14.

Figure 2:
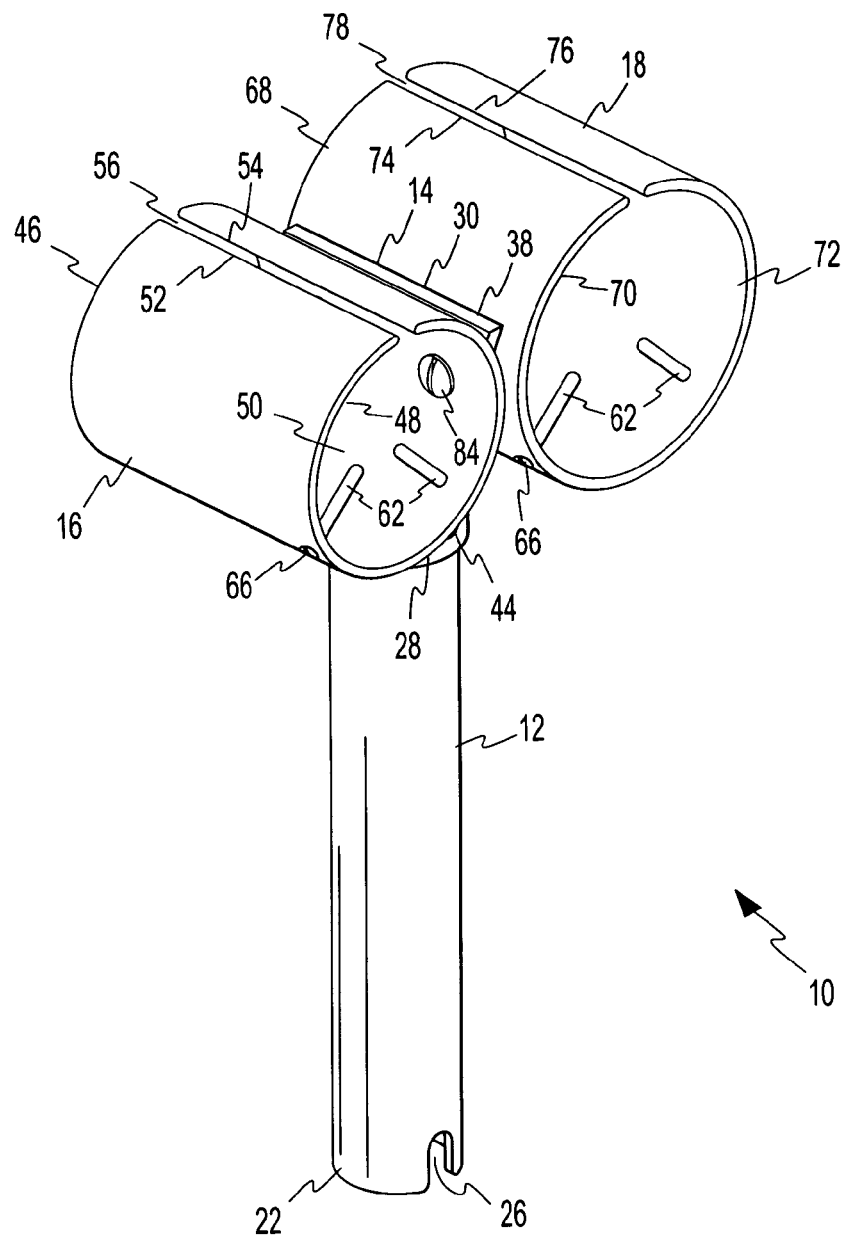
FIG. 2 is a perspective view of the device for holding fish to remove a fish hook from the mouth of a fish in an assembled configuration in accordance with the present version of the invention.

The device for holding fish to remove a fish hook from the mouth of a fish 10 is illustrated in FIG. 2 in the assembled configuration. The first hollow cylindrical member 12 is attached to the connecting member 14 as described previously, and the second 16 and third 18 cylindrical members are attached to opposed sides of the flange 30 of the connecting member 14 as also described previously. The longitudinal axis of the first hollow cylindrical member 12 is disposed in perpendicular relation to the longitudinal axes of the second 16 and third 18 cylindrical members.

The device 10 is attached to a fishing vessel or fishing boat by placing the first hollow cylindrical member 12 at the second end 22 thereof to an existing fishing rod holder already attached to the fishing vessel or fishing boat. The notch 26 at the second end 22 of the first hollow cylindrical member 12 receives a fastener, protuberance or other part or component of the fishing rod holder. In this manner, the notch 26 prevents the first hollow cylindrical member 12 and device 10 from spinning or rotating during use thereof.

Figure 3:
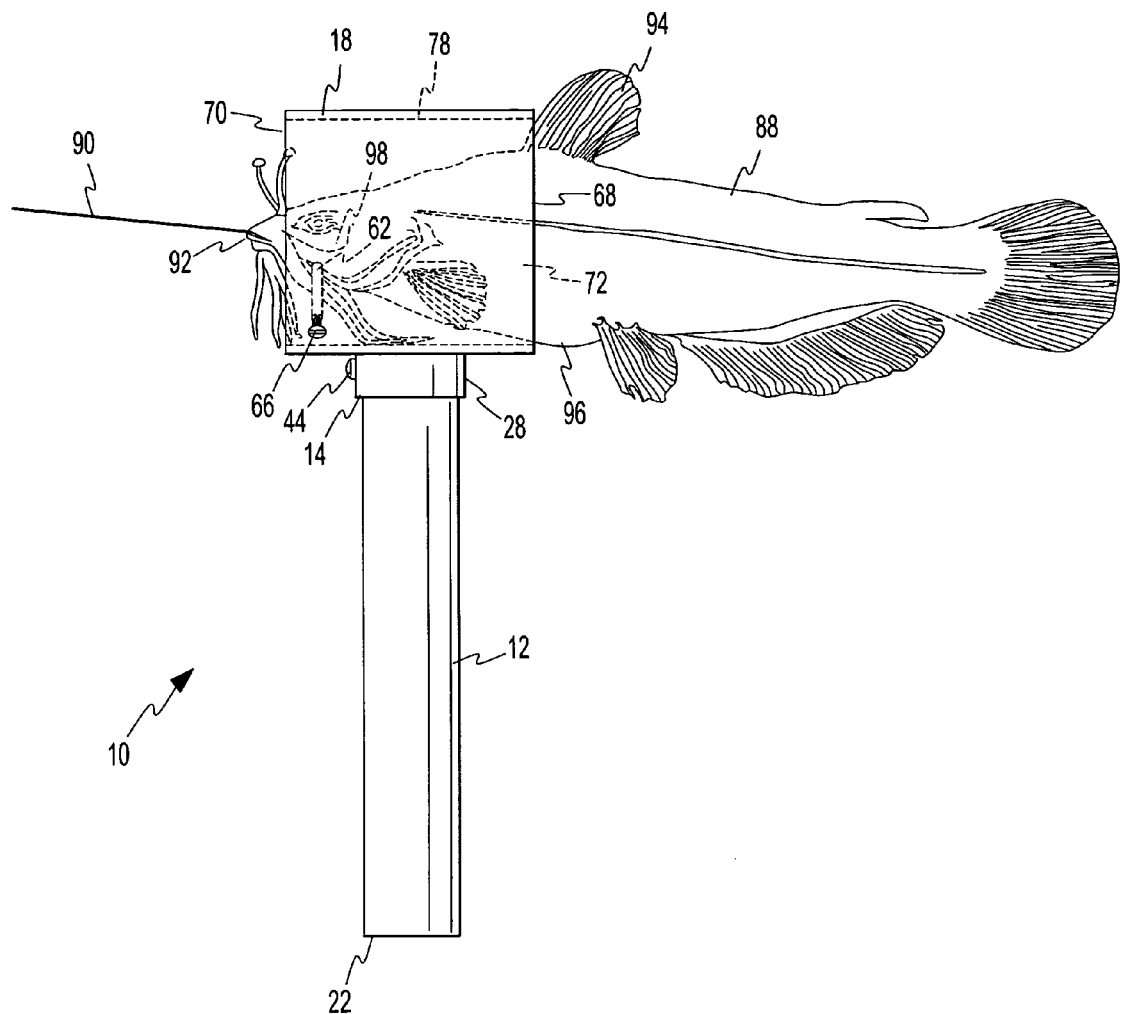
FIG. 3 is a side elevation view of a device for holding fish to remove a fish hook from the mouth of a fish with a fish positioned therein for removal of a fish hook in accordance with the present version of the invention.

As illustrated in FIG. 3, a catfish 88 has swallowed a fishing line 90 with fish hook (not shown) in the mouth 92 thereof. To remove the fishing hook, the catfish 88 is pulled partially within the second 16 or third 18 cylindrical member. As shown, the catfish 88 is pulled by the fishing line 90 within the bore 72 of the third hollow cylindrical member 18 by first passing the fishing line 90 through the gap 78 at the top of the third hollow cylindrical member 18 between first 74 and second 76 side edges thereof. The fishing line 90 is pulled until the catfish 88 frictionally engages the interior surface and dowels 62 of the third hollow cylindrical member 18 at which time the catfish 88 cannot move or become dislodged during removal of the fish hook.

As illustrated, the dorsal fin 94 and lower abdomen 96 of the catfish 88 are pulled tightly against the first end 68 of the third hollow cylindrical member 18. The head 98 of the catfish 88 and stinging barb are contained or enclosed completely within the bore 72 of the third hollow cylindrical member 18. The head 98 is maintained in position by being wedged between and against the dowels 62 of the third hollow cylindrical member 18. With the catfish 88 partially covered and held in an immobile position, the fish hook can be safely removed from the mouth 92 of the catfish 88 without risk of being stung or injured by barbs on the exterior of the catfish.

While this version of the invention has been illustrated and described in detail in the drawings and foregoing description, the same is to be considered as illustrative and not restrictive in character, it being understood that only the preferred embodiment has been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

CONCLUSION AND SCOPE OF INVENTION

From the foregoing, it will be understood by persons skilled in the art that an improved device for holding fish to remove a fish hook from the mouth of a fish has been provided. The invention is relatively simple and easy to manufacture, yet affords a variety of uses. While my description contains many specificities, these should not be construed as limitations on the scope of the version of the invention, but rather as an exemplification of the preferred embodiment thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. A device for holding fish to remove a fish hook from the mouth of a fish, the device comprising:
   (a) a first hollow cylindrical member having a first end and a second opposed end, the second end of the hollow cylindrical member containing a notch;
   (b) a connecting member attached to the first end of the first hollow cylindrical member, the connecting member consisting of a hollow cylindrical member and a flange, the flange attached to and extending from the hollow cylindrical member;
   (c) a second hollow cylindrical member having a first end and a second opposed end, the second hollow cylindrical member attached to a first side of the flange of the connecting member; and
   (d) a third hollow cylindrical member having a first end and a second opposed end, the third hollow cylindrical member attached to a second opposed side of the flange of the connecting member.

2. The device for holding fish to remove a fish hook from the mouth of a fish as recited in claim 1, wherein the hollow cylindrical member of the connecting member is comprised of a lateral sidewall and an end sidewall, the end sidewall located at one end of the lateral sidewall.

3. The device for holding fish to remove a fish hook from the mouth of a fish as recited in claim 2, wherein the flange of the connecting member is attached to and extends from the end sidewall of the hollow cylindrical member of the connecting member.

4. The device for holding fish to remove a fish hook from the mouth of a fish as recited in claim 1, wherein the second hollow cylindrical member terminates at first and second opposed side edges, the opposed side edges disposed in parallel relation to the longitudinal axis of the second hollow cylindrical member and to to each other.

5. The device for holding fish to remove a fish hook from the mouth of a fish as recited in claim 4, wherein a gap is located between first and second opposed side edges of the second hollow cylindrical member.

6. The device for holding fish to remove a fish hook from the mouth of a fish as recited in claim 1, wherein two dowels are attached to the inside surface of the second hollow cylindrical member proximate to the second end thereof.

7. The device for holding fish to remove a fish hook from the mouth of a fish as recited in claim 1, wherein the third hollow cylindrical member terminates at first and second opposed side edges, the opposed side edges disposed in parallel relation to the longitudinal axis of the third hollow cylindrical member and to each other.

8. The device for holding fish to remove a fish hook from the mouth of a fish as recited in claim 7, wherein a gap is located between first and second opposed side edges of the third hollow cylindrical member.

9. The device for holding fish to remove a fish hook from the mouth of a fish as recited in claim 1, wherein two dowels are attached to the inside surface of the third hollow cylindrical member proximate to the second end thereof.

10. The device for holding fish to remove a fish hook from the mouth of a fish as recited in claim 1, wherein the second and third hollow cylindrical members are disposed in parallel relation to each other and in perpendicular relation to the first hollow cylindrical member.

11. The device for holding fish to remove a fish hook from the mouth of a fish as recited in claim 1, wherein the second and third hollow cylindrical members have dissimilar diameters.

12. The device for holding fish to remove a fish hook from the mouth of a fish as recited in claim 1, wherein the second end of the first hollow cylindrical member is able to be fitted over a fastener, protuberance or other part or component of a fishing rod holder with the notch thereof locking the device in position.

13. The device for holding fish to remove a fish hook from the mouth of a fish as recited in claim 1, wherein the second and third hollow cylindrical members can receive therein a fish with the head of the fish wedged between the two dowels attached to the inside surfaces of the second and third hollow cylindrical members so as to facilitate removal of a fish hook from the mouth of the fish.

* * * * *